United States Patent [19]

Tersch et al.

[11] 4,050,350
[45] Sept. 27, 1977

[54] GEAR FINISHING

[75] Inventors: Richard W. Tersch, Grosse Pointe Woods; Arthur B. Bassoff, Oak Park, both of Mich.

[73] Assignee: Lear Siegler, Inc., Santa Monica, Calif.

[21] Appl. No.: 601,915

[22] Filed: Aug. 4, 1975

[51] Int. Cl.$^2$ ............................................. B23F 19/06
[52] U.S. Cl. ............................ 90/1.6 R; 51/105 GG
[58] Field of Search ........................... 90/1.6 R, 1.4; 51/DIG. 1, 26, 105 GG, 99 R

[56] References Cited

U.S. PATENT DOCUMENTS

| 1,658,899 | 2/1928 | Hoke | 51/105 G |
| 2,433,468 | 12/1947 | Mackmann et al. | 90/1.6 R |

FOREIGN PATENT DOCUMENTS

| 1,247,300 | 10/1960 | France | 90/1.6 R |
| 1,159,736 | 12/1963 | Germany | 90/1.6 R |
| 811,419 | 10/1956 | United Kingdom | 90/1.6 R |
| 871,184 | 6/1961 | United Kingdom | 90/1.6 R |
| 279,314 | 8/1970 | U.S.S.R. | 90/1.6 R |

*Primary Examiner*—Francis S. Husar
*Assistant Examiner*—William R. Briggs
*Attorney, Agent, or Firm*—Whittemore, Hulbert & Belknap

[57] ABSTRACT

A gear finishing machine having a rotary work gear support and a rotary honing tool support and a pivot mounting for one of the supports whose pivot axis extends parallel to the rotation axis of the rotary support mounted thereon, the pivot axis being located substantially within the angle between the lines of action of a meshing gear and gear-like hone carried by the supports. In a preferred embodiment the construction is provided in a pivoted tool support head provided with means for fixing the head against pivotal movement for use in gear shaving, or releasing it for limited pivoting movement for use in gear honing.

10 Claims, 7 Drawing Figures

GEAR FINISHING

BRIEF SUMMARY OF THE INVENTION

Gear finishing machines have been used in which the gear and gear-like tool are mounted for meshed rotation in tight mesh under pressure contact. In some of these one of the supports is pivoted in such a way as to provide for pivoting movement which in the past has moved the work gear or gear-like tool generally radially with respect to the tool or gear with which it is in the mesh. In the past it has been noted, particularly in gear honing, that the honing action is different when the gear and tool are rotated in one direction than when they are rotated in the other direction. This appears to have been the result of different pressure conditions existing between the gear and honing tool.

It has now been found that by locating the pivot axis of the pivoted support in a predetermined position, the honing action appears to be substantially identical independent of the direction of rotation, and honing pressure may be maintained at a desirably low value.

Broadly, a location of the pivot axis of the pivoted support mounting means which has proved to be very satisfactory is within the acute angle between the lines of action established by meshed engagement of the gear and tool and displaced laterally from the line joining the rotation axes of the supports by an amount sufficient to cause swinging movement of the support to have a large component of motion toward the other support.

This invention has been embodied in a tool head suspended from a pivot axis displaced substantially above and laterally from the vertical plane, and within the acute angle between the lines of action of the gear and tool.

Means are provided for adjusting the head angularly to provide for a desired crossed axes setting. Means are also provided for locking the head against pivotal movement so that the head may be employed for gear shaving. This locking means may be released to permit limited pivotal movement of the head to accommodate movement thereof in gear honing.

DETAILED DESCRIPTION

Figures 1, 6:
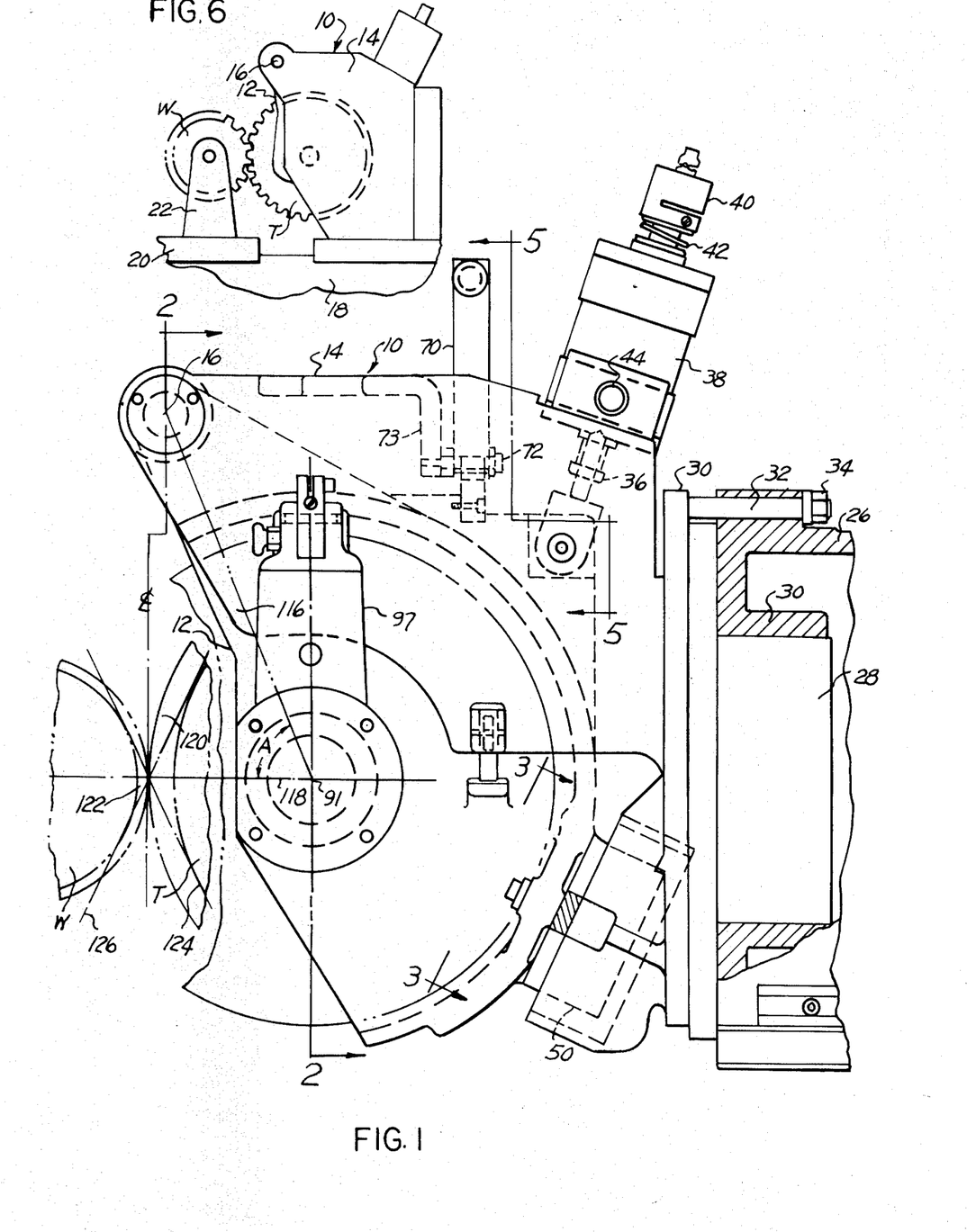
FIG. 1 is a side elevation of the tool head with parts broken away.
FIG. 6 is a diagrammatic view illustrating the relationship of the tool head shown in the previous Figures, with the remainder of a gear finishing machine.

Referring first to FIG. 6, the tool head in its entirety is illustrated at 10 and includes a pivoted support 12 carried by angularly adjustable mounting means 14 having pivot means indicated at 16. The angularly adjustable mounting means 14 is mounted on a fixed base 18 which carries a slide 20 mounted for horizontal movement in FIG. 6, and including support means 22 for mounting a work gear W in mesh with a gear-like tool T. Means are provided for moving the slide 20 horizontally to bring the work gear into tight mesh with the tool.

The angularly adjustable mounting means 14 is angularly adjustable about a horizontal axis as will subsequently appear, so that the work gear W and tool T may be brought into mesh at crossed axes. One of the supports is provided with means (not shown) for driving it in rotation. In addition, means are provided for effecting a relative traverse movement between the gear W and the tool T in a direction parallel to the rotation axis of the work support 22, as well as for effecting meshing relationship and depth feed where required by movement of the slide 20 horizontally toward and away from the tool head 10.

Referring now to FIGS. 1–5 the tool support structure comprises a column portion 26 to which the angularly adjustable mounting means 14 is secured for angular adjustment by a cylindrical projection 28 received in a tubular flanged portion 30 of the column portion 26. The angularly adjustable mounting means 14 is retained in angularly adjusted position by clamping heads 30 fixedly secured to threaded studs 32 which in turn carry clamping nuts 34.

The pivot means 16 connecting the pivoted support 12 to the angularly adjustable mounting means 14 is located in the position best illustrated in FIG. 1, which will be described in detail subsequently. At this time it is sufficient to note that it is displaced to the left from the vertical plane passing through the rotation axis of the pivoted support 12 and is located substantially above the horizontal plane passing through the rotation axis of the rotary support.

A gear shaving operation requires that the relative motions between a gear shaving cutter and a work gear in mesh therewith shall consist of meshed rotation in crossed axes relationship, and a relative traverse between the gear and tool in a plane which is parallel to the axes of both the gear and shaving cutter. The specific direction of traverse may be parallel to the axis of the gear or it may be diagonal with respect thereto. In addition, a depth feed is provided after one or more traverse strokes and of course a reverse feed or withdrawing motion is provided following termination of the shaving cycle.

On the contrary, a gear honing operation is one in which the gear is rotated under relatively light pressure conditions but in full mesh with an abrasive gear-like honing tool. Light pressure is maintained between the gear and hone throughout the operation and relative traverse is provided in a direction parallel to the axis of the gear G. In order to maintain constant light pressure contact between the teeth of the gear and hone, it is necessary for the hone to float and this condition is met by providing a pivot mounting for the rotary support which carries the honing tool.

The pivotal support 12 as illustrated in FIG. 1, is connected through a pivot link 36 connected internally of a cylinder 38 to a piston (not shown), the link extending beyond the cylinder and carrying an adjusting nut 40 constituting a spring stop for a counterbalance spring 42 which counterbalances the weight of the pivoted support 12. Air pressure is supplied to the cylinder, an air connection thereto being indicated at 44. With this arrangement a relatively light clockwise bias may be applied to the pivoted support 12 to maintain a predetermined pressure contact between the teeth of a tool, diagrammatically indicated at T, and a work gear in mesh therewith, a portion of which is indicated diagrammatically at W.

In order to insure suitable control of the motion of the pivoted support, it is provided with a tongue 50 having flat sides in contact with corresponding flat sides of wear plates 52, the position of each of which is adjusted by a plurality of adjusting screws 54. The screws 54 are adjusted to remove all play but to permit free sliding movement of the tongue 50 so that its movement about the axis of the pivot means 16 is freely permitted.

Since under other conditions, such as gear shaving, it is desired to eliminate pivotal or rocking movement of the pivoted support 12, means are provided for locking the pivoted support 12 in a fixed position and this means comprises screws 56 extending through enlarged openings or slots 58 and having threaded engagement at their lower ends as indicated at 60. In addition, slotted blocks 62 are provided, pivoted as indicated at 64 and having laterally extending arcuate slots 66 to receive the screws 56. When the blocks 62 are in the position illustrated in FIG. 4 and the screws 56 are tightened down, it will of course be apparent that the pivoted support 12 is firmly locked against movement about the axis of the pivot support 16. On the other hand, when the screws are loosened and the blocks 62 swung into clearance positions, the pivoted support 12 is freely movable.

In addition to the blocking of the pivoted support 12 against movement about the axis of its pivot means 16, preferably additional clamping means are provided which take the form of a pair of clamping levers 70 pivoted as indicated at 72 to a bracket 73 connected to the angularly adjustable mounting means 14 and having abutment extensions 74 adapted to engage opposite sides of a rigidly fixed abutment plate 76. One of the levers 70 carriers an air cylinder 78 having a piston therein connected to an adjustable abutment screw 80 engageable with the end of the other lever 70, in a relationship best illustrated in FIG. 5. When pressure is applied to the piston within the cylinder 78, the upper ends of the lever 70 are forced apart and the forces exerted by the extensions 74 are thus equalized on opposite sides of the plate 76, thus additionally supporting the pivoted support 12 in fixed position during the gear shaving operation.

Figure 2:
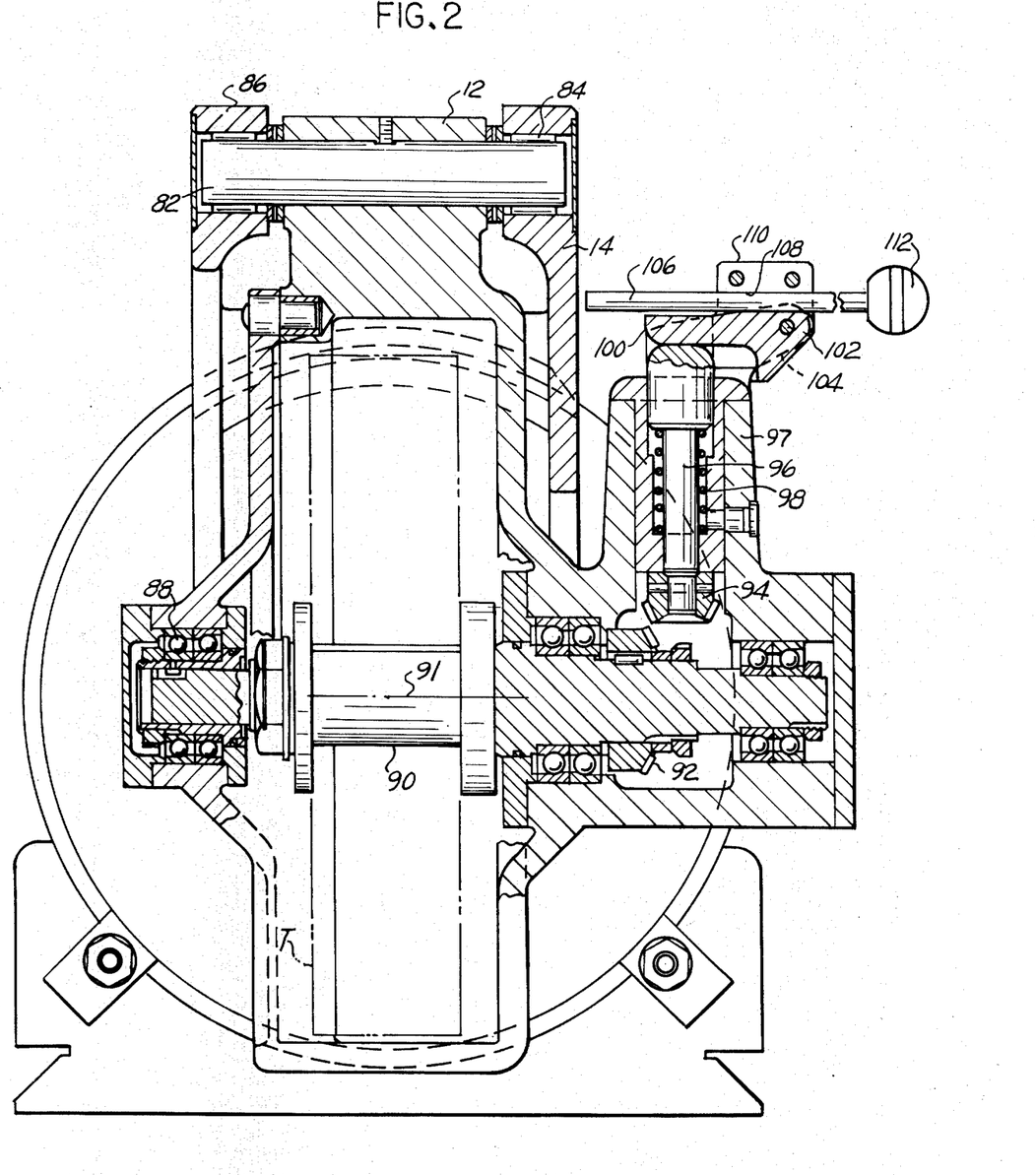
FIG. 2 is a sectional view on the line 2—2, FIG. 1.
Figure 3:
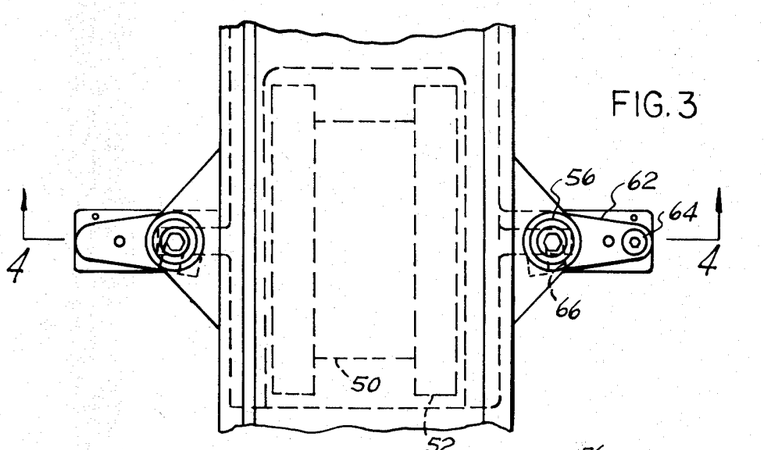
FIG. 3 is a fragmentary elevational view in the direction of the arrows 3—3, FIG. 1.
Figure 4:
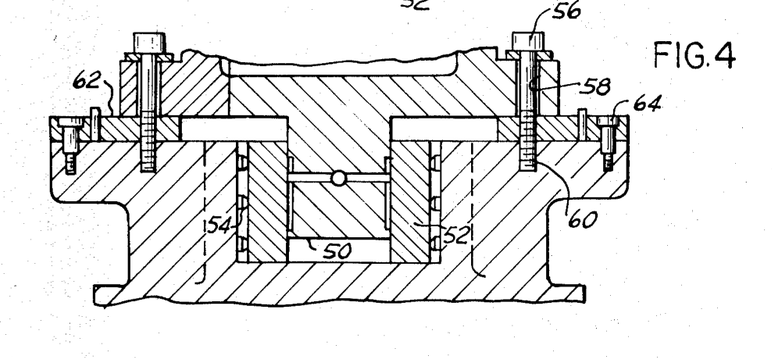
FIG. 4 is a sectional view on the line 4—4, FIG. 3.
Figure 5:
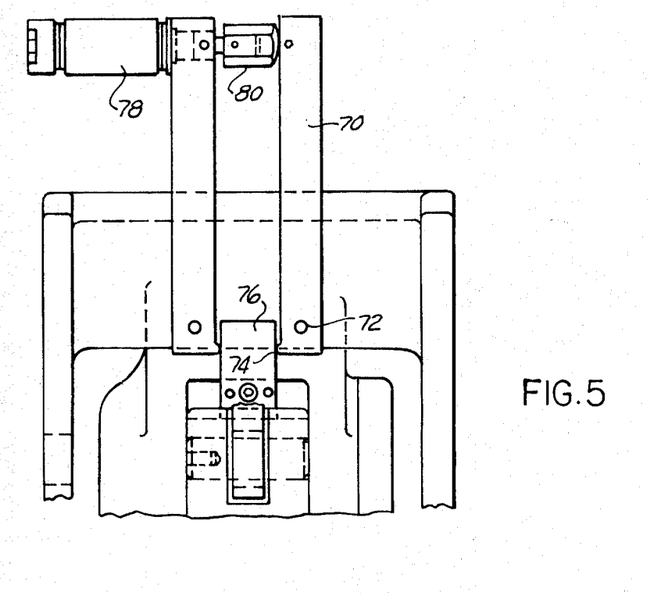
FIG. 5 is a fragmentary sectional view on the line 5—5, FIG. 1.

Referring now to FIG. 2, details of the connection between the angularly adjustable mounting means 14 and the pivoted support 12 are illustrated. As seen in this Figure, a pivot means 16 is shown as comprising a pin 82 fixed in the pivoted support 12 and preferably journaled at its ends as indicated at 84 in ears 86 on the pivot mounting means 14.

A rotary support for suitably mounting a tool T is provided in the pivoted support 12 and takes the form of a shaft 90 mounted in bearings 88 for rotation about an axis indicated at 91.

Inasmuch as the particular tool head illustrated herein is designed for supporting relatively large tools, special means are provided for effecting limited angular movement of a tool T so as to bring the teeth thereof into proper alignment with the teeth of a work gear. This means comprises a bevel gear 92 fixed to the shaft 90 and a bevel gear 94 fixed to a vertically movable shaft 96 in housing 97 normally retained in clearance relation as illustrated in FIG. 2 with respect to the gear 92 by a compression spring 98. A pivot cam 100 is pivoted as indicated at 102 between ears 104 and an operating shaft 106 is slidably movable through an opening 108 provided in an upward extension 110 on the cam 100. The shaft 106 has an operating knob 112 by means of which the operator may move the knob to the right as illustrated in FIG. 2 and thereafter, swing it upwardly to depress the nose of the cam and thereby depress shaft 96 to bring about meshing engagement between the bevel gears 92 and 94. Thereafter, limited rotational movement of the shaft 106 in a horizontal plane results in rotation of the shaft 96 and corresponding rotation of the tool support shaft 90.

Referring now again to the location of the pivot means indicated generally at 16 in FIG. 1 and constituted by the pin 82, it has been found that the precise location of this shaft controls the action resulting from rotation of the gear and tool in mesh, particularly when the tool employed is a honing tool. At this time, as previously noted, the pivoted support 12 is mounted for pivotal movement about the axis of pivot pin 82 forming the pivot support 16 and is urged into pressure engagement with the work gear only by a relatively light air pressure applied to the cylinder 38. In practice the total force exerted beween the gear and honing tool may be only a few pounds.

In the past it was believed desirable to provde for pivot mounting of the pivoted support which provided for approach and separation between the gear and tool in a position such that the relative approach took place substantially in a direction parallel to the line joining the axes of the gear and tool. This corresponded to the direction of movement where the approach and separation was accomplished, not by means of a pivot mounting but by means of a suitable slide. However, it is much preferred to provide for the required relative movement by means of a pivot mounting.

It was found that when the honing operation was carried out by rotating either the gear or hone in one direction under a given predetermined relatively light radial loading, a smooth honing action took place. However, when the direction of rotation was reversed, the smooth honing action did not take place and it appeared that the difference was attributable to a variation in the forces tending to bias the pivoted support for pivotal movement toward and away from the other rotary support.

Figure 7:
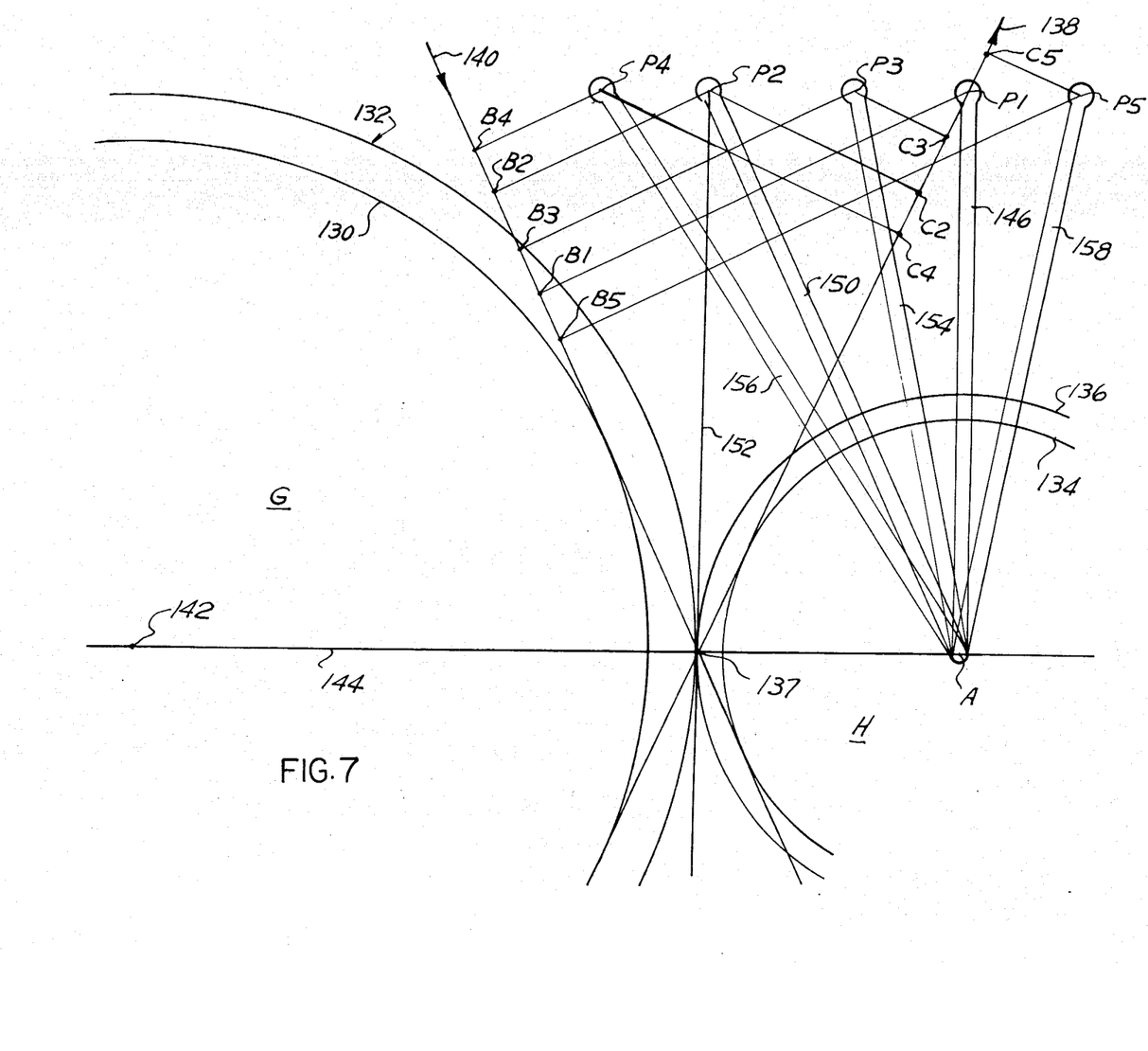
FIG. 7 is a diagrammatic view illustrating the geometry involved.

Referring now to FIG. 7 there is diagrammatically illustrated a portion of a gear-like honing tool H, and a portion of a pinion or work gear G. The base circle of the gear is indicated at 130 and its pitch circle is indicated at 132. The hone has a base circle indicated at 134 and a pitch circle indicated at 136, tangent to the pitch circle 132 at 137. In this case it is assumed that the gear G is positively driven in rotation in tight meshed relation with the hone H, which is mounted for substantially free rotation, although the rotation of the gear and hone will require substantial power due to the tight meshed relationship therebetween.

When the gear is driven in a counterclockwise direction of rotation, a line of action 138 is established, and the force applied therealong to the pivoted hone carrier for the hone is in the direction of the arrow. When the direction of rotation of the gear G is reversed, the line of action between the teeth of the hone and gear is indicated at 140 and the direction of application of force to the pivoted hone carrier is in the direction of the arrow. In this diagrammatic illustration it is assumed that the gear is mounted for rotation with its axis 142 in a fixed position. It is similarly assumed that the hone H is mounted on a pivoted carrier which in FIG. 7 is illustrated as occupying a number of different positions as will subsequently be described.

In the past, where the relative approach and separation between the hone and gear was provided by pivoting a carrier, it was assumed that the axis about which the carrier pivoted should be such that the gear and hone moved directly towards and away from each other along the line of centers, this line being designated in FIG. 7 as 144. In this Figure the gear and hone are not illustrated with their axes crossed, but in practice the axes of the gear and hone will be crossed at a small angle as is well understood in the art. Accordingly, the line 144 may be considered as the common normal to the axes of the gear and hone.

In FIG. 7 such an arrangement is indicated by the carrier 146 which is pivoted to a fixed pivot P1 and which mounts the axis A of the gear for movement in an arc tangent to the line of centers 144. In this Figure point P1 is shown as located on the line of action 138. It will be noted that point P1 is located on the line 146 which is perpendicular to the line 144, representing the line of centers, or the common normal to the axes of gear G and hone H and passing through the center of the pivoted gear-like member, which in this instance is the hone H.

In this diagrammatic showing no attempt has been made to indicate the usual crossed axes relation between the gear G and the hone H. However, the axis of the pivot mounting P1 in the machine disclosed herein will be parallel to the axis A of the hone so that swinging movement of the support 146 will cause movement of the hone toward and away from the gear in an arc whose center is located at the axis of the pivot mounting P1. It will be understood that the gear or hone will be angularly adjusted to provide the usual crossed axes relationship.

For the limited movement occurring during honing operations, this movement may be considered as essentially straight-line movement along the line of centers.

The engagement between the teeth of two gear-like members, such as a work gear and a hone in the present instance, results in forces being applied to the teeth of the driven member (here the hone H) along the line of action. Under the first assumed condition where the gear G is rotated counterclockwise, this force is applied along the line of action 138 in the direction of the arrow.

Forces applied to the teeth of the hone along the line of action 138 in the direction of the arrow tend to cause clockwise rotation of the hone and a movement of the hone to the right, but a further component of force, dependent upon the resistance to rotation, is applied to the carrier. Under the assumed conditions, since the line of action 138 passes through the pivot point P1, at this time no torque is derived from the rotation of the hone and gear tending to cause movement of the hone either towards or away from the gear G.

However, if the direction of rotation is reversed so that the gear rotates in a clockwise direction and drives the hone H in a counterclockwise direction, the teeth of the gear and hone engage along the line of action 140 and forces are applied to the teeth of the gear along this line of action in the direction of the arrow applied thereto. These forces of course effect counterclockwise rotation of the hone H but, to the extent that this rotation is opposed, an additional component of force is developed tending to cause the carrier 146 to pivot about the pivot mounting P1 in a counterclockwise direction, or in other words, to cause the carrier 146 to swing in a direction to move the hone H out of mesh with the gear G. This force of course is the result of the fact that the forces applied in the direction of the arrow along the line of action 140 have a torque arm P1B1 determined by the length of a perpendicular drawn from the point P1 to the point B1 on the line of action. It is of course possible to provide an extraneous force, such for example, as a force applied by an air cylinder or the like, so that the resultant of the forces applied by the air cyliner and the torque applied to the carrier 146 is in an amount to produce the desired pressure between the gear and hone. However, if the direction of rotation is again reversed it will be apparent that since the force developed by the air cylinder and the force developed as a result of torque applied to the carrier 146 would then be additive, an excess force is applied, producing undesirably great honing pressure.

If now, the hone H is supported by a carrier 150 which is pivoted about a pivot mounting P2 located on a line 152 which is perpendicular to the line of centers 144 and passes through the pitch point 137, the results are quite different. In this case the pivot point P2 is located on a perpendicular to the line of centers 144 passing through the pitch point 137, and hence lies midway between the lines of action 138 and 140. With this arrangement counterclockwise rotation of the gear G produces forces along the line of action 138 which in addition to rotating the hone H, will produce a torque tending to rotate the carrier 150 in a counterclockwise direction as a result of the torque arm P2C2, or in a direction to move hone H out of mesh.

If now, the direction of the drive gear is reversed so that the gear rotates in a clockwise direction, the teeth of the gear and hone come into contact along the line of action 140 and forces are applied to the teeth of the hone along this line in the direction of the arrow applied thereto. In addition to producing rotation of the hone, these forces apply a torque to the carrier 150 which is also in a counterclockwise dierection tending to swing the carrier in a direction to move the hone out of mesh with the gear G. This torque is the result of the application of force with the torque arm P2B2.

It will be observed that with this particular arrangement, rotation of the gear G in either direction develops equal torques in the same direction tending to swing the carrier in a direction to move the hone H out of mesh with the gear. Accordingly, if as a result of gravity, the application of force from an air cylinder, a spring, or the like, forces are applied to the carrier 150 sufficient to overcome the torque applied thereto as a result of rotation of the gear and hone, a constant force will be applied to the hone holding it in mesh with a predetermined pressure between the teeth of the gear and hone. Moreover, since the torque applied to the carrier 150 is in a direction to move the hone out of mesh with the gear, a constant biasing force of only slightly greater magnitude may be applied to control honing pressure at any desired value.

This last condition exists if the pivot mounting for the carrier for the hone is located anywhere along the line 152. However, the location of the pivot point P2 should be substantially separated from the line of centers 144 so that swinging movement of the carrier will produce a major component of motion along the line of centers 144.

In the foregoing the location of the point P1 along the line of action 138 and also in such a position that the line P1A is perpendicular to the line of centers, is not normally a practical relationship since it requires location of the point P1 at too great a distance from the axis A of the hone.

Also, in accordance with the foregoing, it appears that the relationship which makes the direction of rotation produce equal torques in the same direction for both directions of rotation requires the pivot point to be located along the line 152. This is not always practical as a matter of machine design and it is noted that location of the pivot point between the lines of action and preferably as close as practicable to the line 152 is useful.

Two such positions are illustrated and will be separately described.

If a carrier 154 is provided which is pivoted at the pivot mounting P3, rotation of the gear in a counter-clockwise direction produces a torque on the carrier 154 as a result of the torque arm P3C3, tending to swing the carrier 154 in a counter-clockwise direction or to move the hone out of mesh. If the direction of rotation is reversed a torque is applied to the carrier 154 having a torque arm P3B3 which is substantially greater than the previously mentioned torque, but this torque also being in a direction to move the hone out of mesh with the gear. While these torques are of substantially different magnitude in the same direction, they are in the same direction.

If the hone is supported by a carrier 156 pivoted at the pivot mounting P4, the torque supplied to the carrier as a result of torque arms P4B4 and P4C4 are again in the same direction but of different magnitude.

Finally, a particularly undesirable location for the pivot mounting of a carrier 158 is illustrated at P5, which is outside the acute included angle between lines of action 138 and 140. In this case counterclockwise rotation of the gear results in a torque applied to the carrier 158 through the torque arm P5C5, tending to move the hone H into tighter mesh. In this situation however, when the direction of rotation is reversed so that the forces are applied along the line of action 140, the torque applied to the carrier 158 is counterclockwise, tending to move the hone H away from the gear G. Thus, in this case forces applied to carrier 158 by rotation in different directions are widely different since not only is the torque arm P5B5 relatively great, but also the torque arm P5C5 produces a torque on the carrier 158 which is in the opposite direction.

From the foregoing it appears that advantages are obtained by locating the pivot mounting for the pivoted carrier within the acute angle between the lines of action and as close as is reasonably possible to the line perpendicular to the line of centers passing through the pitch point.

A proper location of the pivot mounting for the pivoted carrier may provide substantially equal forces tending to produce separation between the gear and hone irrespective of the direction of rotation, which forces can be overcome by a constant oppositely directed force with the result that the actual honing pressure may be maintained at a constant relatively small value, which is desirable.

While the foregoing specific description refers to the gear in a fixed position and the hone as movable, it will of course be apparent that either the hone or the gear may be pivoted and that either the hone or the gear may be positively driven in rotation.

Referring again to the specific machine design illustrated in FIG. 1, it will be observed that the axis of pivot support 16 is located substantially within the acute angle between lines of action 124 and 126, and could be located on the bisector of this angle, if found to be necessary.

In a typical gear honing operation the work gear and gear-like hone are in tight mesh with their axes crossed. Either the hone or gear is positively driven in rotation. The gear and hone are relatively movable toward and away from each other to apply honing pressure to the teeth of the gear. In the past, honing machines have been provided in which a carrier for either the hone or the gear is movable rectilinearly to cause approach and separation. Preferably however, the necessary relative approach and separation is provided by a carrier for either the gear or hone which is pivoted at a point such that rocking movement of the carrier moves the gear or hone carried thereby generally toward and away from the other member.

Honing is an operation in which it is essential to maintain honing pressure at a relatively low value. When a hone member or gear member drives the other member in tight meshing relation, forces are applied to the engaged teeth of the members along inclined lines of action as is well understood. The lines of action are oppositely and equally inclined with respect to the line joining both the centers of the gear and hone, and the direction of the application of force is determined by the direction of rotation. In gear honing, substantial forces are required to rotate the driving member (either the gear or hone) because of the tight meshing relation and because of the fact that the teeth of the honing tool are abrasive in nature. Either the hone or the gear is maintained in a fixed position and the other member is movable as previously mentioned. The forces tending to move the movable member are applied to the movable member along the line of action. The primary force developed by rotation of the driving member is of course the force tending to rotate the driven member. This in turn produces another force tending to cause separation between the gear and hone along the line of centers, this latter force being a function of the pressure angle of the teeth. Both of the forces just described are equal irrespective of the direction of rotation. However, a third force is developed which may be considered as a torque applied to the pivoted carrier tending to swing it in one direction or the other about its pivot axis. This torque is determined by the magnitude of the force applied along the line of action and the torque arm measured by the perpendicular distance from the pivot mounting of the carrier to the line of action.

In some cases it has been found in the past that with one direction of rotation the carrier tends to move so as to bring about a condition of loose mesh between the gear and hone. This of course requires the application of an extraneous force such for example as one applied by an air cylinder to hold the carrier in a position in which the gear and hone are in tight mesh with a predetermined relatively light pressure contact. When however, the direction of rotation is reversed, depending upon the location of the pivot mounting for the carrier, a torque of substantial magnitude may be applied tending to move the carrier in a direction to cause tight mesh between the gear and hone, and with other forces remaining the same, a substantially greater than desired pressure is applied between the gear and hone. This is not only undesirable because the magnitude of the pressure may be injurious or may cause improper honing action, but also it is undesirable because more material will be removed from one side of the gear teeth than from the other.

Obviously, the most desirable situation is one in which the pivot mounting for the carrier is located such that the torque applied to the pivoted carrier is of the same magnitude and direction irrespective of the direction of rotation, and in either case, in a direction to separate the gear and hone, or to reduce the honing pressure therebetween. While this is not always possible as a practical matter of machine design, the ideal condition will at least be approached or substantial improvement will be observed when the axis of the pivot mounting of the carrier is located substantially within the acute angle between the lines of action.

In the actual machine illustrated the pivot mounting for the pivoted member is located above its axis. However, so far as the principles of the invention are concerned, the pivot mounting 16 might be mounted generally below the pivoted member. As a matter of fact, the principles of the present invention would apply if the swinging movement of the pivoted member took place in a horizontally disposed plane or an oblique plane.

The location of the pivot at P1 is in accordance with prior practice, since this provides movement of the hone H directly toward the gear G. In the present invention, the location of the pivot is substantially displaced from the line 146, as indicated at P2, P3 and P4, and is preferably as close to the point P2 as possible, this point lying on the bisector of the acute angle between the lines of action. The direction of displacement of the pivot point from the perpendicular to the line of centers 144 is of course toward the bisector 152.

It is of course appreciated that when the pivot mounting of the pivoted support occupies any position other than the position P1, as illustrated in Figure 7, swinging movement of the pivoted member takes place generally in a very limited arc whose tangent of course extends perpendicular to the line joining the pivot support and the center of the pivoted member. However, these tangential lines of course include components parallel to the line of centers 144 and movement along such arcs in a direction to cause approach between the gear and hone of course produces the necessary honing action.

What we claim as our invention is:

1. A gear honing machine comprising
   a rotary work support having means to support a work gear member for rotation on the rotation axis of said work support,
   a rotary tool support positioned relative to said work support to support a honing tool member in mesh with a gear member on the rotary work support for rotation on the rotation axis of said tool support,
   a gear-like honing tool member on said rotary tool support,
   means operative to drive one of said supports in rotation to rotate the gear and tool carried thereby in tight meshed relation,
   pivot mounting means pivotally mounting one of said supports, the pivot axis of said mounting means being located at a position displaced substantially from the line which is perpendicular to the line of centers of the rotary supports and which passes through the center of the pivotally mounted support, the displacement being in a direction toward the line perpendicular to the line of centers which bisects the acute angle between the lines of action of the gear and tool members, and occupying a position substantially within such acute angle.

2. A machine as defined in claim 1 in which the axis of said pivot mounting means is adjacent the bisector of said acute angle.

3. A machine as defined in claim 1 in which the axis of said pivot mounting means is parallel to the axis of rotation of the support mounted thereon.

4. A machine as defined in claim 1 comprising a fixed base and in which the pivot mounting means comprises a mounting means adjustably carried by said base for angular adjustment about said line of centers and a pivoted support pivoted to said mounting means and angularly adjustable therewith as a unit about the said line of centers.

5. A machine as defined in claim 1 comprising
   a frame having a stationary support portion and a slide mounting portion,
   a slide on said slide mounting portion,
   said rotary work support comprising a rotary gear support on said slide,
   said slide being movable in a first direction toward and away from said stationary support portion for depth feed and in a second direction perpendicular to said first direction and parallel to the axis of said rotary gear support for traverse,
   an intermediate tool support member angularly adjustable on said stationary support portion to provide for adjustment of the crossed axes relationship between the axes of a work gear on said rotary gear support and a gear-like tool in mesh therewith,
   a pivotable tool support member pivoted at said pivot mounting means to said intermediate tool support member,
   a rotary tool support on said pivotable tool support member,
   pressure applying means connected between said intermediate tool support member and said pivotable tool support member to pivot said pivotable tool support member in a direction to move said rotary tool support toward and away from said rotary work support to apply a predetermined pressure between a tooth and gear on said rotary supports, and selectively operable means locking said pivotable tool support in fixed position on said intermediate tool support member.

6. A machine as defined in claim 5 in which said pressure applying means comprises adjustable counterbalance spring means and air cylinder means operable to provide light pressure contact between a fully meshed gear and gear-like hone carried by said rotary supports.

7. A machine as defined in claim 5 comprising releasable clamping means to lock said pivotable tool support member to said intermediate tool support member while said machine is used as a shaver.

8. A machine adapted for selective use as a gear shaver and gear honer, comprising
   a frame having a stationary support portion and a slide mounting portion,
   a slide on said slide mounting portion,
   a rotary gear support on said slide,
   said slide being movable in a direction toward and away from said stationary support portion for depth feed and in a direction perpendicular to said first direction and parallel to the axis of said rotary gear support for traverse,
   an intermediate tool support member angularly adjustable on said stationary support portion to provide for adjustment of the crossed axes relationship between the axes of a work gear on said rotary gear support and a gear-like tool in mesh therewith, a pivotable tool support member pivoted to said intermediate tool support member, a rotary tool support on said pivotable tool support member, means driving one of said rotary supports in rotation, pressure applying means connected between said intermediate tool support member and said pivotable tool support member to pivot said pivotable tool support member in a direction to move said rotary tool support toward and away from said rotary work support to apply a predetermined pressure between a tooth and gear on said rotary supports, and selectively operable means locking said pivotable tool support in fixed position on said intermediate tool support member, releasable clamping means locking said pivotable tool support member to said intermediate tool support member while said machine is used as a shaver, the location of said clamping means being substantially diametrically opposite the pivot connection between said intermediate tool support member and said pivotable tool support member with respect to the axis of said rotary tool support.

9. A machine as defined in claim 5 comprising slidable guide means acting between said pivotable tool support member and said intermediate tool support member in a position substantially separated from the pivot connection between said tool support members.

10. A machine adapted for selective use as a gear shaver and gear honer, comprising a frame having a stationary support portion and a slide mounting portion.

a slide on said slide mounting portion, a rotary gear support on said slide, said slide being moveable in a direction toward and away from said stationary support portion for depth feed and in a direction perpendicular to said first direction and parallel to the axis of said rotary gear support for traverse, an intermediate tool support member angularly adjustable on said stationary support portion to provide for adjustment of the crossed axes relationship between the axes of a work gear on said rotary gear support and a gear-like tool in mesh therewith, a pivotable tool support member pivoted to said intermediate tool support member, a rotary tool support on said pivotable tool support member, means driving one of said rotary supports in rotation, pressure applying means connected between said intermediate tool support member and said pivotable tool support member to pivot said pivotable tool support member in a direction to move said rotary tool support toward and away from said rotary work support to apply a predetermined pressure between a tooth and gear on said rotary supports, and selectively operable means locking said pivotable tool support in fixed position on said intermediate tool support member, slidable guide means acting between said pivotable tool support member and said intermediate tool support member in a position substantially separated from the pivot connection between said tool support members, in which the position of said guide means is substantially diametrically opposite the pivot connection between said intermediate tool support member and said pivotable tool support member with respect to the axis of said rotary tool support.

* * * * *